US012417605B1

(12) United States Patent
Looper

(10) Patent No.: US 12,417,605 B1
(45) Date of Patent: Sep. 16, 2025

(54) SYSTEMS AND METHODS FOR GENERATING SIZE-OPTIMIZED THREE-DIMENSIONAL CONTENT BASED ON CONSTRAINTS THAT MODIFY THE THREE-DIMENSIONAL CONTENT MODELING

(71) Applicant: Illuscio, Inc., Culver City, CA (US)

(72) Inventor: Sean Looper, Flagstaff, AZ (US)

(73) Assignee: Illuscio, Inc., Culver City, CA (US)

( * ) Notice: Subject to any disclaimer, the term of this patent is extended or adjusted under 35 U.S.C. 154(b) by 0 days.

(21) Appl. No.: 18/950,535

(22) Filed: Nov. 18, 2024

(51) Int. Cl.
*G06T 19/20* (2011.01)
*G06T 15/08* (2011.01)
*G06T 17/20* (2006.01)

(52) U.S. Cl.
CPC .............. *G06T 19/20* (2013.01); *G06T 15/08* (2013.01); *G06T 17/20* (2013.01); *G06T 2210/56* (2013.01); *G06T 2219/2004* (2013.01); *G06T 2219/2016* (2013.01)

(58) Field of Classification Search
None
See application file for complete search history.

(56) References Cited

U.S. PATENT DOCUMENTS

| | | | |
|---|---|---|---|
| 11,783,542 B1* | 10/2023 | Goldman | G06T 7/20 |
| | | | 345/423 |
| 2018/0286139 A1* | 10/2018 | Moncayo | G06T 19/20 |
| 2018/0330480 A1* | 11/2018 | Liu | G06T 15/04 |
| 2022/0096933 A1* | 3/2022 | Raymond | G06T 15/005 |
| 2023/0015037 A1* | 1/2023 | Kojima | G06T 17/00 |
| 2024/0104847 A1* | 3/2024 | Gautron | G06T 17/205 |
| 2024/0257467 A1* | 8/2024 | Thulasidoss | G06T 19/20 |
| 2024/0355047 A1* | 10/2024 | Supikov | G06T 7/55 |
| 2024/0386668 A1* | 11/2024 | Lan | G06T 19/20 |

* cited by examiner

*Primary Examiner* — Andrew G Yang
(74) *Attorney, Agent, or Firm* — Ansari Katiraei LLP; Arman Katiraei; Sadiq Ansari

(57) ABSTRACT

A three-dimensional (3D) content creation system modifies operation of a radiance field, neural network, and/or other generative artificial intelligence in order to generate 3D content based on constraints that modify the 3D content modeling. The system receives constraints for reducing a first size of a first 3D representation of a 3D object, and generates different sets of 3D primitives with values for one or more parameters of the 3D primitives that satisfy the constraints. The system selects a particular set of 3D primitives that produces a visual representation that differs from the first 3D representation by less than a threshold amount, and presents the particular set of 3D primitives as a size-optimized second 3D representation of the 3D object with a second size that is less than the first size of the first 3D representation.

20 Claims, 7 Drawing Sheets

SYSTEMS AND METHODS FOR GENERATING SIZE-OPTIMIZED THREE-DIMENSIONAL CONTENT BASED ON CONSTRAINTS THAT MODIFY THE THREE-DIMENSIONAL CONTENT MODELING

BACKGROUND

For any visual content, there is a tradeoff between quality or fidelity and size. More data is needed to encode the additional quality or fidelity. This holds true for three-dimensional (3D) content. For instance, the quality or fidelity of a 3D mesh representation may be increased by defining more smaller-sized meshes or polygons to represent a 3D object or 3D scene. The quality or fidelity of a point cloud may be increased by defining more points to represent a 3D object or 3D scene. Similarly, the quality or fidelity of a Gaussian splat representation may be increased by defining more smaller-sized Gaussian splats to represent a 3D object of 3D scene. Other ways to increase the quality or fidelity include using more bits to define position, color, and/or other visual characteristics with greater granularity.

Deduplication and quantization techniques may be applied after the 3D content is generated in order to reduce the 3D content size or the amount of data that is encoded as part of the 3D content. When implemented in a lossless manner, these techniques are unable to provide or produce significant data reduction. When implemented in lossy manner, these techniques may introduce visual artifacts, create aliasing, distort the positioning and/or visual characteristics of the 3D content, or otherwise reduce the 3D content quality disproportionally relative to the data reduction or in an uncontrolled manner. For instance, similar color values of different 3D primitives may be replaced with a single indexed color value regardless of the color values of the surrounding 3D primitives or the effect that the replaced indexed color value has on the overall visual representation.

DETAILED DESCRIPTION OF PREFERRED EMBODIMENTS

The following detailed description refers to the accompanying drawings. The same reference numbers in different drawings may identify the same or similar elements.

Provided are systems and methods for generating size-optimized three-dimensional (3D) content based on constraints that modify the 3D content modeling. The systems and methods include modifying operation of the radiance field, neural network, and/or other generative artificial intelligence (AI) that may be used to generate the 3D primitives for the 3D content. The modified operation includes accounting for the constraints during the 3D primitive generation phase and generating a 3D representation that visually matches a 3D object or 3D scene by a threshold amount using 3D primitives that satisfy the constraints. More specifically, the modified operation includes providing the constraints as inputs, iteratively generating different sets of 3D primitives with different constrained values, data types, or sizes, comparing the different sets of 3D primitives against a loss function, and outputting a selected set of 3D primitives that satisfies the inputted constraints and that generates the 3D representation of the 3D object or the 3D scene with an acceptable amount of quality or fidelity deviation specified in the loss function.

Figure 1:
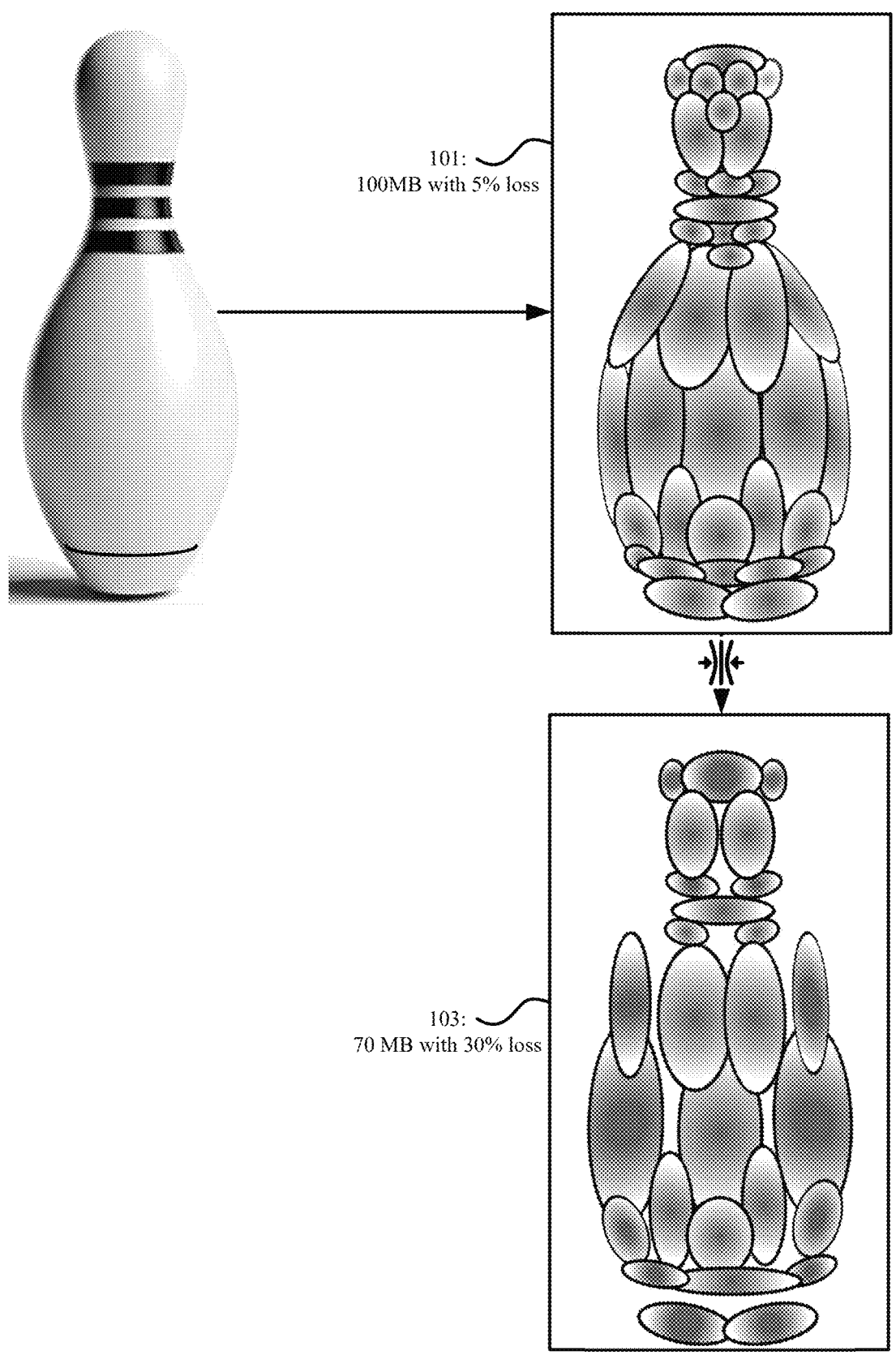
FIG. 1 illustrates a technique for optimizing three-dimensional (3D) content for size using a post-processing techniques after the 3D content has been generated to represent a 3D object.

FIG. 1 illustrates a technique for optimizing 3D content 101 for size using a post-processing technique after the 3D content has been generated to represent a 3D object. 3D content 101 is defined with a set of 3D primitives. In this example, the set of 3D primitives correspond to Gaussian splats that collectively recreate the visual appearance (e.g., 3D shape and color) of a bowling pin.

To optimize 3D content 101 for size, the quantization and deduplication techniques replace redundant values or similar values defined in the set of 3D primitives with an index to a single definition of the value and/or restrict the range of values that may be defined for the various 3D primitive parameters (e.g., x, y, and z position, red, green, and blue color, transparency, reflectivity, etc.) in order to produce reduced 3D content 103. Positions, coloring, and/or other visual characteristics of the 3D primitives may change as a result of the quantization and deduplication techniques being applied to the already generated or defined set of 3D primitives.

In other words, 3D content 101 is generated to closely recreate the form and visual appearance of the 3D object, and the data reduction techniques that are applied to 3D content 101, after it is generated, modify or distort the form and visual appearance of the 3D object. The data reduction techniques change the positioning, coloring, and/or other visual characteristics of the 3D primitives for the sole purpose of reducing the dataset without regard as to how those changes affect the form or visual appearance of the reduced 3D content. Consequently, reduced 3D content 103 has a distorted overall appearance (e.g., structure and coloring) relative to 3D content 101 and the original 3D object.

Figure 2:
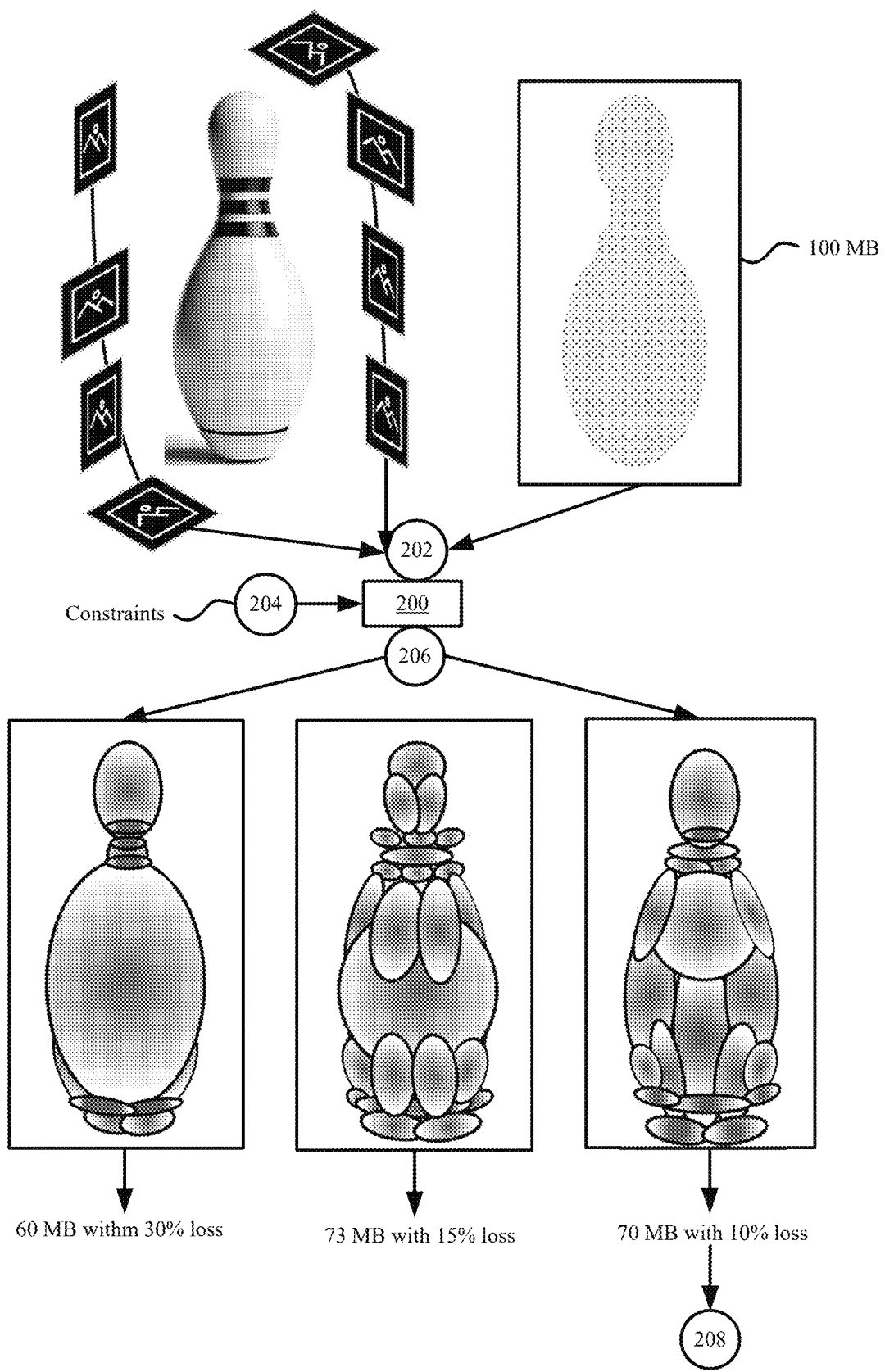
FIG. 2 illustrates an example of generating a size-optimized 3D content based on constraints that are accounted for during the 3D content modeling in accordance with some embodiments presented herein.

FIG. 2 illustrates an example of generating a size-optimized 3D content based on constraints that are accounted for during the 3D content modeling in accordance with some embodiments presented herein. 3D content creator 200 receives (at 202) an original high-fidelity encoding of a 3D object. The high-fidelity encoding may include multiple two-dimensional (2D) images that capture the 3D object from different perspectives or may include an uncompressed or unoptimized mesh, point cloud, splat, or other 3D representation of the 3D object that has a first size.

3D content creator 200 receives (at 204) a set of constraints for limiting the size of the size-optimized 3D content that is generated from the original high-fidelity encoding. The set of constraints may specify a reduced second size for the size-optimized 3D content and/or various 3D primitive parameters that should be targeted for data reduction when generating the 3D primitives for the size-optimized 3D content.

3D content creator 200 defines the 3D primitives for the size-optimized 3D content according to the received (at 204) set of constraints. Specifically, 3D content creator 200 trains a model to generate (at 206) different sets of 3D primitives that form different 3D representations of the 3D object and that are of a reduced second size as a result of adhering to the specified constrains and. As part of the model training, 3D content creator 200 compares (at 208) each generated set of 3D primitives against the original high-fidelity encoding of the 3D object, and selects (at 210) the set of 3D primitives that maximizes the fidelity of the size-optimized 3D content or that generates the size-optimized 3D content with the least amount of quality loss relative to the original high-fidelity encoding.

Although the post-processing techniques and the constrained 3D content model training may generate the 3D content with an equal size or amount of data, the constrained 3D content model training generates the size-optimized 3D content with greater visual accuracy and detail relative to the original high-fidelity encoding than the post-processing techniques. The 3D primitives generated by the constrained 3D content model training more closely match the contours and forms of the 3D object because the data reduction and/or constraints are accounted for at the time the 3D primitives are generated to represent the original high-fidelity encoding. In other words, 3D content creator 200 generates 3D primitives that satisfy the constraints to match the shape and form of the 3D object, whereas the post-processing techniques take 3D primitives that are generated to match the shape and form of the 3D object and adjust the positioning and visual characteristics of the 3D primitives in any manner that achieves a desired data reduction regardless of whether those adjustments reduce the fidelity of the reduced 3D content.

Figure 3:
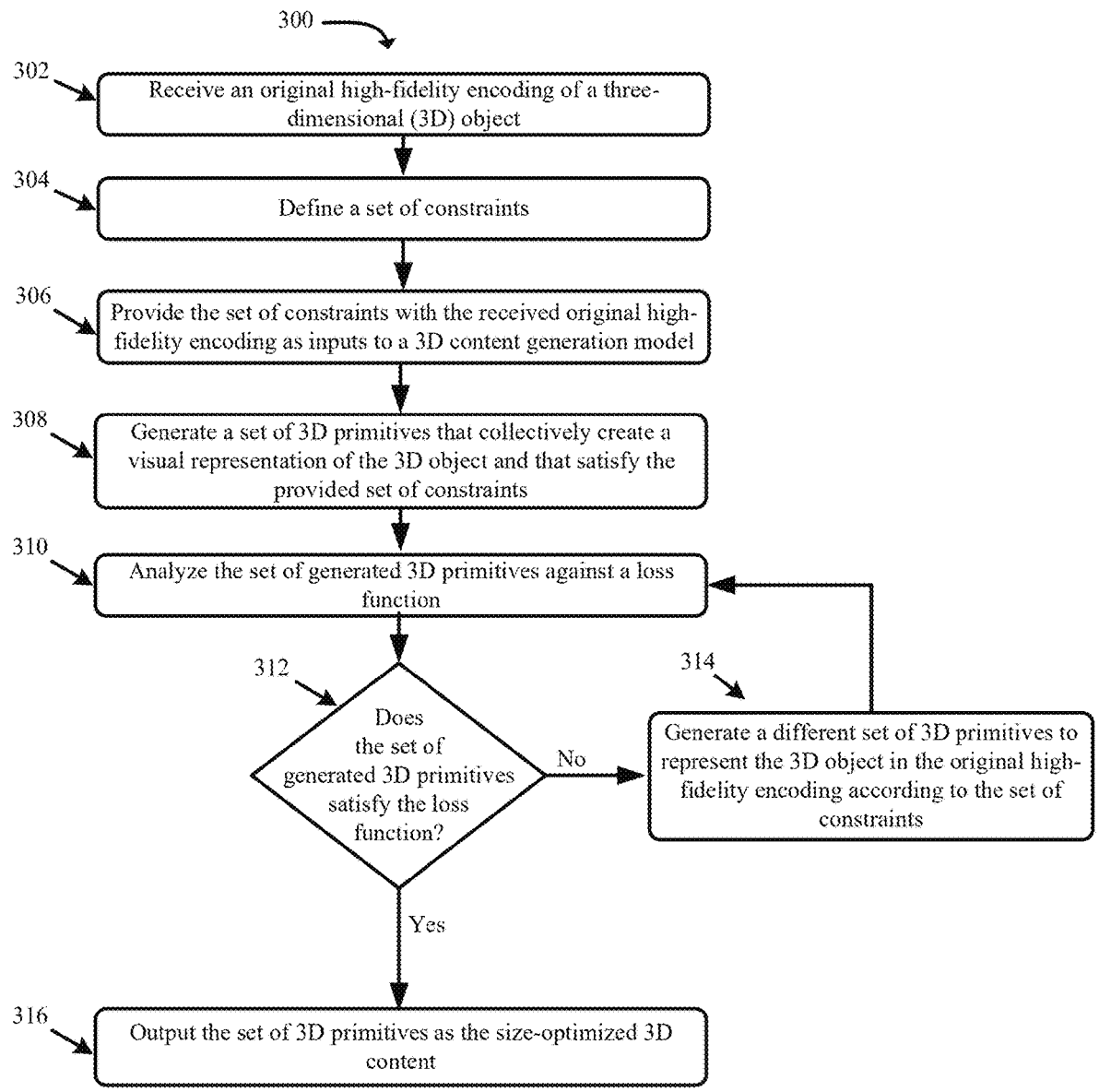
FIG. 3 presents a process for performing the 3D content model training based on an input set of constraints in accordance with some embodiments presented herein.

FIG. 3 presents a process 300 for performing the 3D content model training based on an input set of constraints in accordance with some embodiments presented herein. Process 300 is implemented by 3D content creator 200.

3D content creator 200 may include one or more devices or machines with processor, memory, storage, network, and/or other hardware resources that are adapted for the specialized generation of the size-optimized 3D content in accordance with the embodiments presented herein. In some embodiments, 3D content creator 200 is part of a streaming system that optimizes the size of 3D content for streaming across a bandwidth-limited data network. In some other embodiments, 3D content creator 200 is part of a 3D graphics system. In some such embodiments, 3D content creator 200 generates the size-optimized 3D content for rendering on a device with different 3D rendering resources. For instance, 3D content creator 200 may generate 3D content at a first size for rendering at a particular frame rate on a virtual reality, mixed reality, augmented reality, enhanced reality, or other spatial computing device, and may generate the 3D content at a second size for rendering at the particular frame rate on a desktop computer that may have more 3D rendering resources than the spatial computing device.

Process 300 includes receiving (at 302) an original high-fidelity encoding of a 3D object at a first size for generation of a size-optimized 3D representation of the 3D object at a reduced second size. The original high-fidelity encoding may include two-dimensional (2D) images that capture the 3D object from different angles or perspectives. The original high-fidelity encoding may include an uncompressed or unoptimized set of 3D primitives that defines the 3D structure of the 3D object and that defines the colors and/or other visual characteristics across the 3D structure with a large first amount of data. For instance, the original high-fidelity encoding may be a 3D mesh representation that represents the 3D object with a connected set of polygons or meshes. Alternatively, the original high-fidelity encoding may be a point cloud that represents the 3D object with a disconnected set of points that are distributed in a 3D space.

Process 300 includes defining (at 304) a set of constraints that limit the size of the 3D representation to be generated from the received (at 302) original high-fidelity encoding of the 3D object. The set of constraints may be defined (at 304) relative to parameters of the 3D primitives used to construct the 3D representation of the 3D object. The 3D primitives may include meshes, points, Gaussian splats, and/or other splats. Each 3D primitive is defined with one or more positions. For instance, each mesh is defined with two or more vertices that each have an x, y, and z coordinate. Each point of a point cloud and each Gaussian splat are defined with a single x, y, and z coordinate. Each 3D primitive is also defined with one or more visual characteristics. The visual characteristics may correspond to red, green, blue, and/or other colors values. The visual characteristics may also specify an opacity, a covariance (for how the 3D primitive is scaled), a radius, a reflectivity, and/or other parameters that change the visual appearance of the 3D primitive.

In some embodiments, a constraint may be defined (at 304) to specify the data type that is used for defining one or more parameters of the 3D primitive. For instance, a constraint may specify that the 3D primitive position is defined using a 1-byte data type (e.g., char data type), a 2-byte data type (e.g., short data type), 4-byte data type (e.g., integer or float data type), etc. A constrained data type may limit the range of unique value that may be defined for the constrained 3D primitive parameter which, in turn, may affect the fidelity with which that constrained 3D primitive is presented or rendered.

In some embodiments, a constraint may be defined (at 304) to limit the values that may be specified for specific parameters of the 3D primitives. In some such embodiments, the constraint may be a defined (at 304) as a range of values. The constraint to limit the values of a parameter may lead to greater deduplication, whereby more 3D primitives may be defined with the same shared values that may be replaced with an index rather than redundantly defining the same shared values in the definition of each 3D primitive. For example, an index may be used to represent a specific color combination of red, green, and blue values. In this example, the index (e.g., a single numerical integer) may be used to replace the 3 float or integer values representing the red, green, and blue color combination. Defining (at 304) constraints on specific parameters may be used to deprioritize and lower the amount of data used to encode those specific parameters while prioritizing and/or not reducing the amount of data that is used to encode other parameters. For instance, the color and positional accuracy of the 3D primitives may be preserved and data reduction may be achieved by constraining parameters for the reflectivity, transparency, and other visual characteristics of the 3D primitives.

In some embodiments, the set of constraints may be defined (at 304) relative to the overall generation of the 3D primitives and/or the desired size for the size-optimized 3D representation. For instance, the constraints may specify a desired size reduction of at least 30% or reducing the size of the original high-fidelity encoding by at least 30 megabytes, and 3D content creator 200 may apply different constraints to the different 3D primitive parameters to generate the size-optimized 3D representation with the specified size constraint.

Process 300 includes providing (at 306) the set of constraints with the received (at 302) original high-fidelity encoding as inputs to a 3D content generation model. Providing (at 306) the set of constraints may include configuring or modifying operation of the 3D content generation model. The 3D content generation model may include an enhanced radiance field, neural network, and/or generative AI that generates the 3D primitives for the size-optimized 3D content according to a loss function and the provided (at 306) set of constraints.

Process 300 includes generating (at 308) a set of 3D primitives that collectively create a visual representation of the 3D object and that satisfy the provided (at 306) set of constraints. In some embodiments, the 3D content generation model uses Stochastic Gradient Descent to generate (at 308) the set of 3D primitives. In some embodiments, the set of 3D primitives may include different sized, shaped, and colored meshes or polygons that collectively form a visual representation of the 3D object. In some embodiments, the set of 3D primitives may include a unique distribution of different sized and colored points that collectively form a visual representation of the 3D object. In some embodiments, the set of 3D primitives may include different sized, shaped, and colored splats (e.g., Gaussian splats) that collectively form a visual representation of the 3D object.

The generated (at 308) set of 3D primitives are constrained according to the provided (at 306) set of constraints. For instance, the set of constraints may restrict the colors of the generated (at 308) 3D primitives to 8-bit colors. Accordingly, the 3D content generation model may generate a set of Gaussian splats with sizes, shapes, and positions that produce a first approximation of the 3D object structure and with a first set of 8-bit colors assigned to the first set of Gaussian splats for a first approximation of the 3D object coloring.

Process 300 includes analyzing (at 310) the set of generated (at 308) 3D primitives against a loss function. The analysis (at 310) includes comparing the visual representation created by the set of generated (at 308) 3D primitives to the original visual representation created from the received (at 302) original high-fidelity encoding of the 3D object. The loss function evaluates or quantifies the amount by which the visual representation created by the set of generated (at 308) 3D primitives differs from the original visual representation. In particular, the loss function calculates positional and visual characteristic variation at corresponding regions of the different visual representations.

Process 300 includes determining (at 312) whether the set of generated 3D primitives satisfies the loss function. The set of generated 3D primitives satisfies the loss function when the visual representation created by the set of generated 3D primitives has less than a permitted amount of loss relative to the original visual representation. The permitted amount of loss may be specified as one of the specified constraints or predefined as part of the loss function (e.g., set at 20%).

In response to determining (at 312—No) that the set of generated 3D primitives do not satisfy the loss function, process 300 includes retraining the 3D content generation model with the provided (at 308) set of constraints. Retraining the 3D content generation model may include iteratively generating (at 314) a different set of 3D primitives to represent the 3D object in the original high-fidelity encoding according to the set of constraints. The different set of 3D primitives may approximate or match the original visual representation more or less closely than the previously generated set of 3D primitives. Generating (at 314) the different set of 3D primitives may include redefining the 3D primitives from the previously generated set of 3D primitive for regions where there is a large deviation or more loss than is acceptable between the created visual representation and the original visual representation, or generating an entirely new set of 3D primitives that satisfy the provided (at 306) set of constraints. For instance, the 3D content generation model may generate a second set of Gaussian splats with some differing sizes, shapes, and positions to produce a second approximation of the 3D object structure and with a second set of 8-bit colors assigned to the second of Gaussian splats for a second approximation of the 3D object coloring. The first and second sets of Gaussian splats may have different numbers of splats, splats at different positions, splats with different sizes and shapes at the same or different positions, and/or splats with different visual characteristics at the same or different positions, wherein the first set of Gaussian splats may correspond to the previous set of generated 3D primitives.

Process 300 includes analyzing (at 310) the new set of generated 3D primitives against the loss function. Process 300 iterates between the retraining (at 314) and analyzing (at 310) operations until a set of 3D primitives satisfying the provided (at 306) set of constraints create a visual representation that deviates by less than the permitted amount of loss with the original visual representation.

In response to determining (at 312—Yes) that the set of 3D primitives satisfy the loss function, process 300 includes outputting (at 316) the set of 3D primitives as the size-optimized 3D content. Outputting (at 316) the set of 3D primitives may include presenting or providing the set of 3D primitives to a rendering engine for visualization, streaming the set of 3D primitives to a device that requests the 3D content over a data network, or storing the set of 3D primitives in conjunction with one or more identifiers that identify the set of constraints that the 3D content was generated for or that identify the size of the size-optimized 3D content for subsequent presentation or transmission in circumstances with limited network or rendering resources that the set of 3D primitives have been optimized for.

Figure 4:
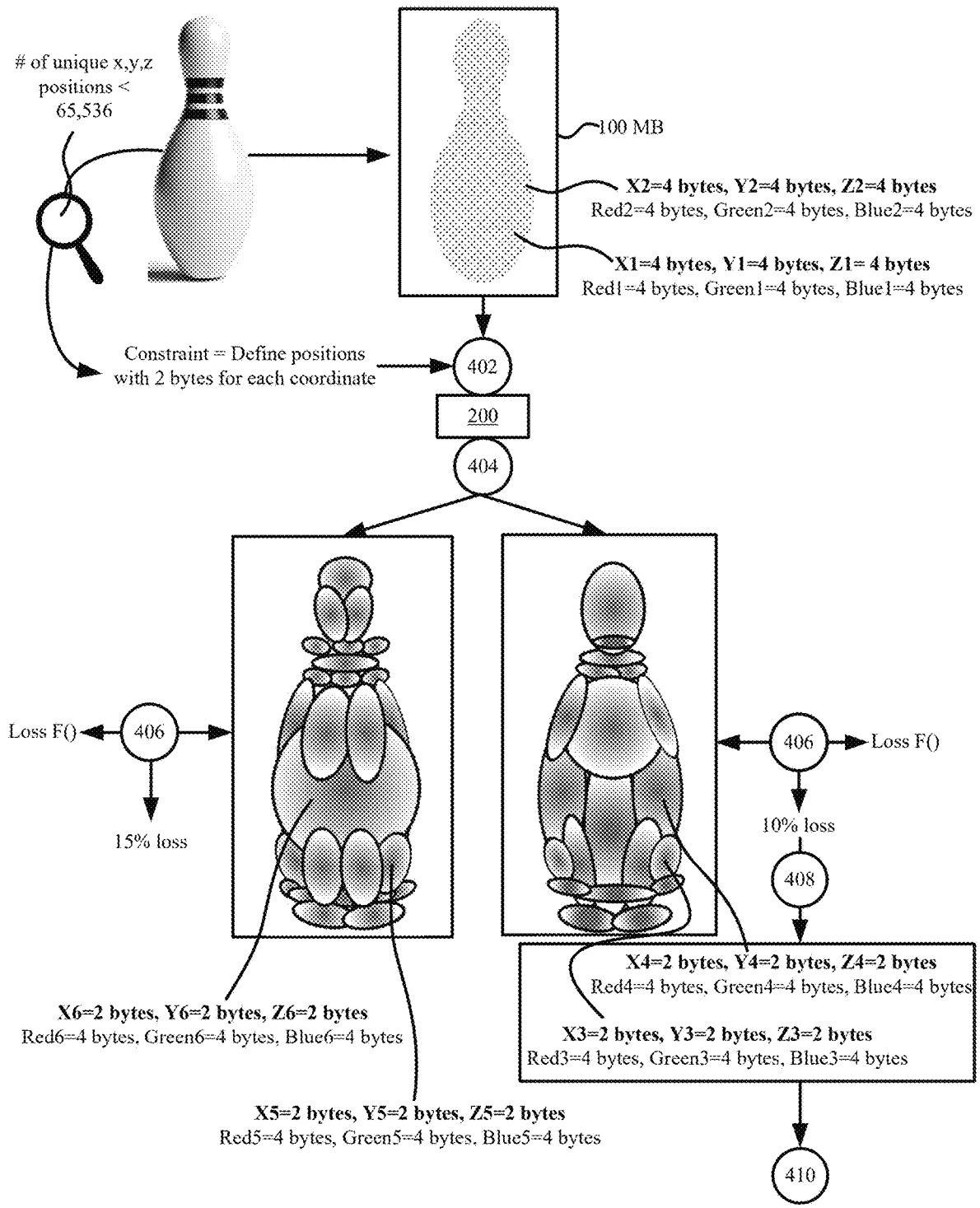
FIG. 4 illustrates an example of training a 3D content creation model with a data type constraint in accordance with some embodiments presented herein.

FIG. 4 illustrates an example of training a 3D content creation model with a data type constraint in accordance with some embodiments presented herein. The represented 3D object may have low structural or positional variation. For instance, the 3D object may be relatively flat and smooth with minimal contouring about its surface. Accordingly, a user may want to deprioritize the positional accuracy of the generated 3D content and prioritize the visual characteristics accuracy. In other words, the user may request that the overall size of the generated 3D content be reduced by focusing the data reduction on the 3D primitive positions. To do so, the user may define a data type constraint that limits the 3D primitive positions to a 2-byte short data type rather than 4-byte integer or float data types. This constraint limits the number of unique positions of the 3D space in which the 3D primitives for representing the 3D object may be defined. 3D content creator 200 receives (at 402) the data type constraint that is specified for the 3D primitive positions and an original high-fidelity encoding of the 3D object.

3D content creator 200 generates (at 404) different sets of 3D primitives with 2-byte constrained positions and different 4-byte color values (e.g., float data type) for each 3D primitive. 3D content creator 200 evaluates (at 406) each generated (at 404) set of 3D primitives against a loss function, and selects (at 408) a particular set of 3D primitives that are defined with the 2-byte constrained positions and that create a visual representation that deviates relative to the other sets of 3D primitives by the least amount from the original visual representation created by the original high-fidelity encoding of the 3D object or that deviates from the original visual representation by an acceptable amount of loss specified in the loss function.

3D content creator 200 defines (at 410) the size-optimized 3D content for the specified constraint based on the selected (at 408) particular set of 3D primitives. In this example, the specified constraint limits or reduces the amount of data used to encode the positions of the 3D primitives relative to the other 3D primitive parameters, thereby allowing the user to prioritize the encoding and/or accuracy of certain parameters over other parameters when generating the size-optimized 3D content. The user may therefore manually control where the data reduction and/or loss occurs in the encoding of the size-optimized 3D content. Moreover, the user may manually inspect the original high-fidelity encoding of the 3D object to determine the parameters that may be less affected if constrained during the modeling, and thereby assist or improve the training of the model by focusing the constraints on the determined parameters that have the least impact on the fidelity or quality of the resulting size-optimized 3D content.

Figure 5:
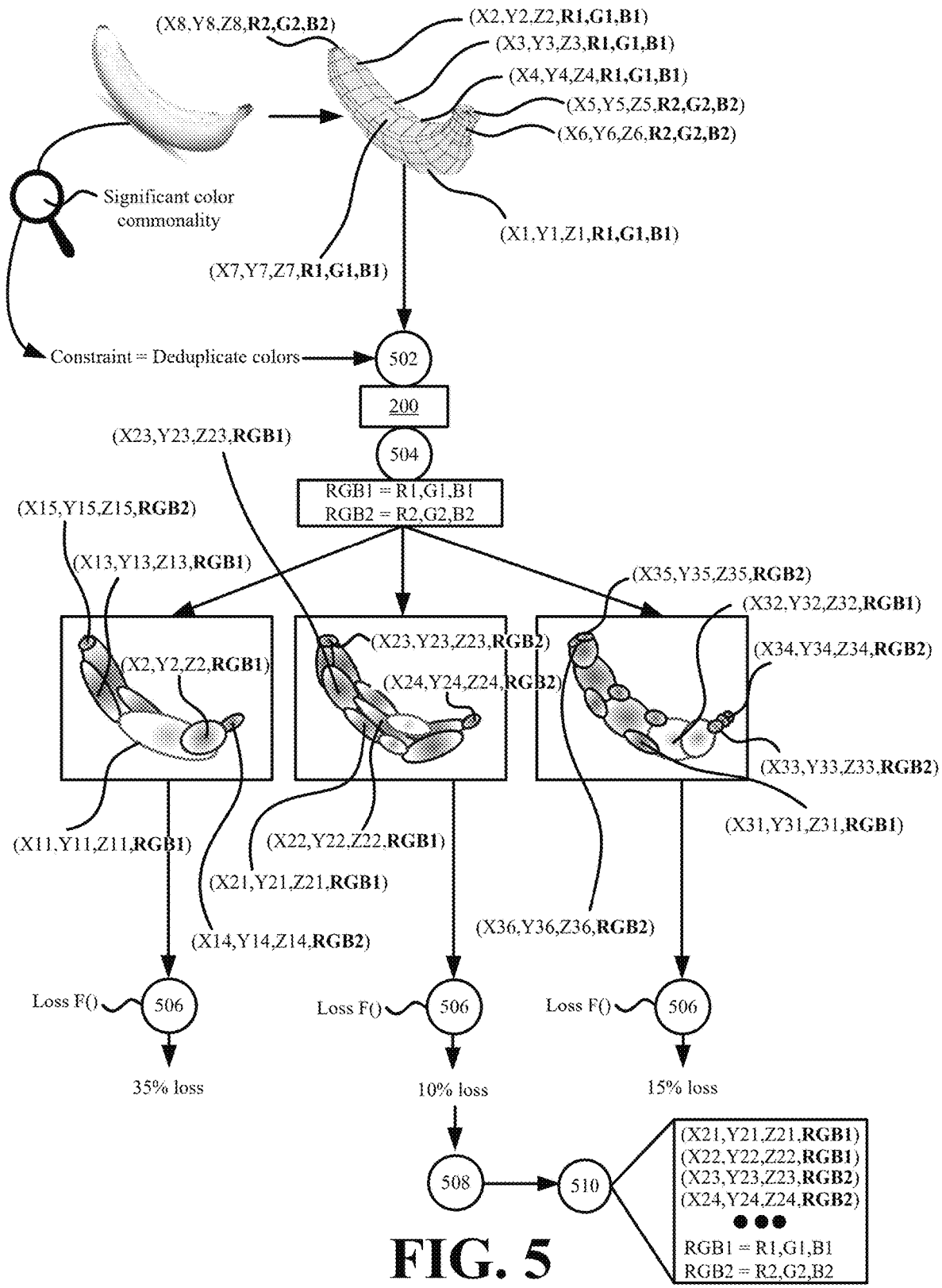
FIG. 5 illustrates an example of generating a size-optimized 3D content based on a constraint specified for values of a particular 3D primitive parameter in accordance with some embodiments.

FIG. 5 illustrates an example of generating a size-optimized 3D content based on a constraint specified for values of a particular 3D primitive parameter in accordance with some embodiments. A user may determine that a 3D object has a limited repeating set of colors. For instance, the 3D object may be a baseball that has various shades of white, red for the stitching, and black text, or a banana that has various shades of yellow for the peel and various shades brown for the stem and for various marks about the peel. In these examples, restricting the data types for the colors yields less data reduction than deduplicating the repeating color values. For instance, a 2-byte data type to represent each of the red, green, and blue colors requires 6 total bytes. However, a single 2-byte data type may be serve as an index for 65,536 different colors that are only defined once for each index. Accordingly, 3D content creator 200 receives (at 502) a constraint that specifies performing deduplication on a limited range of values for the 3D primitive color parameters and an original high-fidelity encoding of the 3D object.

3D content creator 200 generates (at 504) different sets of 3D primitives with the red, green, and blue color parameters replaced with a single indexed color value. The indexed color value for some 3D primitives may be exact matches to the color of the points or features of the 3D object that is represented by those 3D primitives, and the indexed color value for other 3D primitives may be approximated or best-matching colors for the points or features of the 3D object that is represented by those 3D primitives. For instance, a represented point or feature of the 3D object may have a red color value of 250, a blue color value of 75, and a green color value of 93. There may be no indexed color value that matches that combination of red, blue, and green color values. However, a particular index may be associated with a red color value of 250, a blue color value of 80, and a green color value of 90 and that particular index may be defined as an approximate color for the 3D primitive that is generated for the represented point or feature.

3D content creator 200 evaluates (at 506) each generated (at 504) set of 3D primitives against a loss function, and selects (at 508) a particular set of 3D primitives that are defined with the limited range of indexed color values and that create a visual representation that deviates relative to the other sets of 3D primitives by the least amount from the original visual representation created by the original high-fidelity encoding of the 3D object or that deviates from the original visual representation by an acceptable amount of loss specified in the loss function.

3D content creator defines (at 510) the size-optimized 3D content for the specified constraint based on the selected particular set of 3D primitives. The constraining of the color values to the deduplicated indexed color values provides nearly a 3 to 1 reduction in the amount of data used to encode the 3D primitive colors. The data reduction is even greater when a fewer number of 3D primitives in the size-optimized 3D content are used to represent the original 3D primitives of the original high-fidelity encoding of the 3D object.

By defining the constraints (e.g., data types, limited range of values, deduplication, etc.) for specific 3D primitives, the user may manually control which parameters (e.g., position, color, reflectivity, opacity, etc.) are encoded with the least amount of data and/or are subject to the greatest loss. In some embodiments, the user may prefer an even reduction of data or may prefer that 3D content creator 200 automatically determine which parameters may be represented with less data with the least impact to the overall quality or fidelity of the size-optimized 3D content. In some such embodiments, the user may specify a size constraint to limit the total size of the generated 3D content, and 3D content creator 200 may automatically determine the amount of data reduction to apply to the different parameters of the 3D primitives in order to generate the size-optimized 3D content in compliance with the user-specified size constraint.

Figure 6:
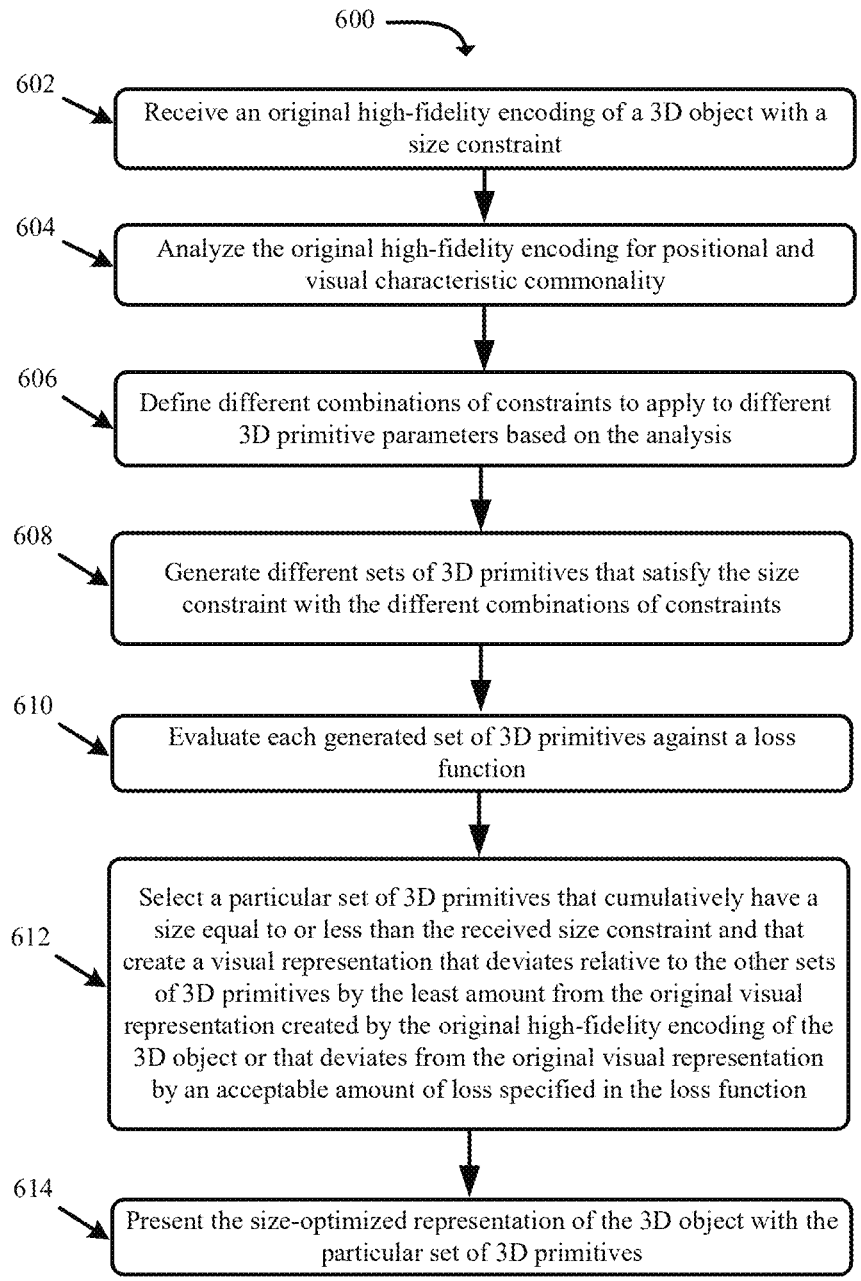
FIG. 6 presents a process for automatically determining an amount of data reduction to apply to different 3D primitive parameters and generating a size-optimized 3D content based on constraints that are automatically specified for the different 3D primitive parameters in accordance with some embodiments presented herein.

FIG. 6 presents a process 600 for automatically determining an amount of data reduction to apply to different 3D primitive parameters and generating a size-optimized 3D content based on constraints that are automatically specified for the different 3D primitive parameters in accordance with some embodiments presented herein. Process 600 is implemented by 3D content creator 200.

Process 600 includes receiving (at 602) an original high-fidelity encoding of a 3D object with a size constraint. In some embodiments, 3D content creator 200 receives (at 602) a request to generate a 3D representation of the 3D object with a size that is equal to or less than the size constraint. The original high-fidelity encoding may be an uncompressed or unoptimized 3D mesh representation, point cloud, or splat representation of the 3D object. For instance, the original high-fidelity encoding of the 3D object may have a size of 1 gigabyte and the size constraint may specify generating the size-optimized 3D representation of the 3D object to be no more than 700 megabytes.

Process 600 includes analyzing (at 604) the original high-fidelity encoding for positional and visual characteristic commonality. The analysis (at 604) may include calculating an amount of variation in the positional coordinates, color values, and/or other visual characteristics. For instance, 3D content creator 200 may determine the number of unique x-coordinate, y-coordinate, and z-coordinate positions for the positional commonality, may determine the number of unique color combinations (e.g., red, green, and blue color values) specified throughout the original high-fidelity encoding, and/or may determine the number of unique values that are defined for other visual characteristics.

Process 600 includes defining (at 606) different combinations of constraints to apply to different 3D primitive parameters based on the analysis (at 604). For instance, 3D content creator 200 may define (at 606) tighter or different types of constraints to the parameters that have the least variation or number of different values and looser or no constraints to the parameters that have the most variation or number of different values Process 600 includes generating (at 608) different sets of 3D primitives that satisfy the size constraint with the different combinations of constraints and that produce different visual representations of the 3D object. For instance, 3D content creator 200 may generate (at 608) a first set of 3D primitives that produces a first visual representation of the 3D object with a 2-byte data type constraint on the 3D primitive positional and color parameters, may generate (at 608) a second set of 3D primitives that produces a second visual representation of the 3D object with a 2-byte data type constraint on the 3D primitive positional parameters and a deduplicated indexed color value for the 3D primitive color parameters, and may generate (at 608) a third set of 3D primitives that produces a third visual representation of the 3D object with a constrained range of values for the 3D primitive positional parameters, a deduplicated indexed color value for the 3D primitive color parameters, and a 1-byte data type constraint on the 3D primitive opacity and reflectivity parameters.

3D content creator 200 evaluates (at 610) each generated (at 608) set of 3D primitives against a loss function, and selects (at 612) a particular set of 3D primitives that cumulatively have a size equal to or less than the received (at 602) size constraint and that create a visual representation that deviates relative to the other sets of 3D primitives by the least amount from the original visual representation created by the original high-fidelity encoding of the 3D object or that deviates from the original visual representation by an acceptable amount of loss specified in the loss function.

3D content creator 200 presents (at 614) the size-optimized representation of the 3D object with the particular set of 3D primitives. In response to a request for the size-optimized representation, 3D content creator may stream or otherwise present the particular set of 3D primitives to the requestor.

Figure 7:
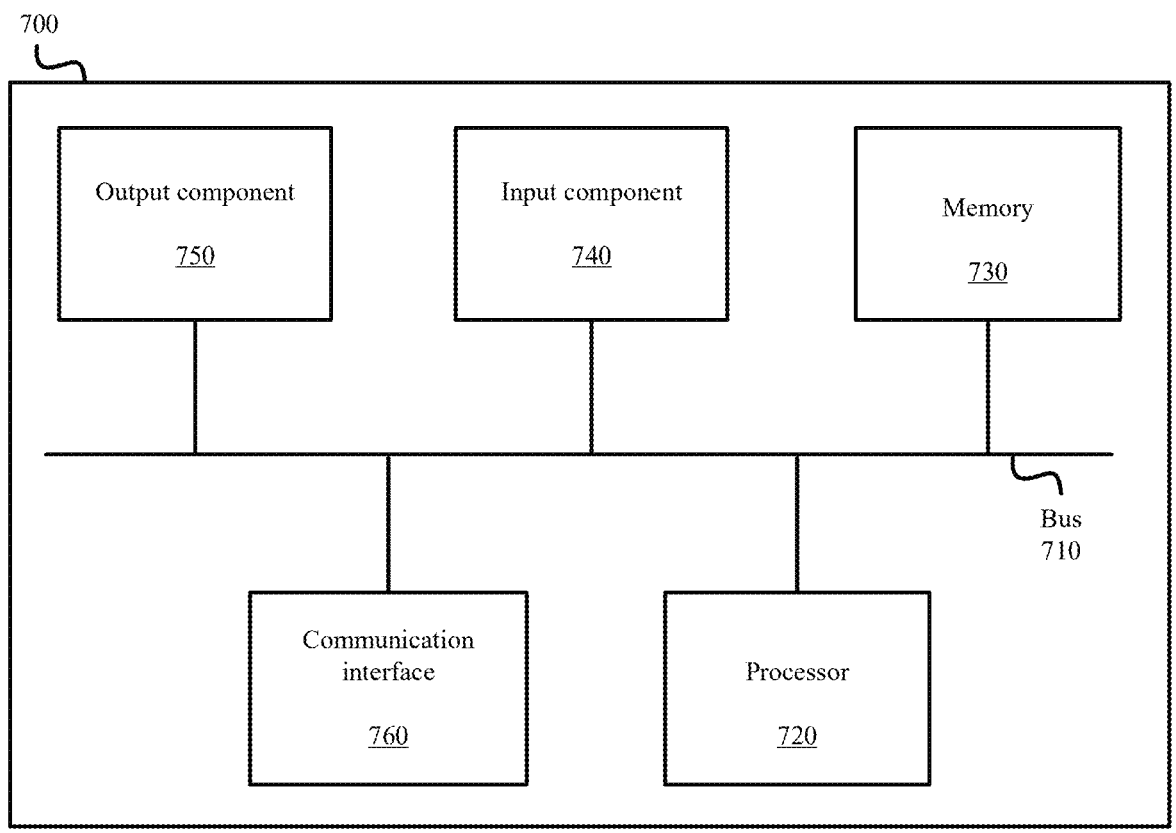
FIG. 7 illustrates example components of one or more devices, according to one or more embodiments described herein.

FIG. 7 is a diagram of example components of device 700. Device 700 may be used to implement one or more of the tools, devices, or systems described above (e.g., 3D content creator 200). Device 700 may include bus 710, processor 720, memory 730, input component 740, output component 750, and communication interface 760. In another implementation, device 700 may include additional, fewer, different, or differently arranged components.

Bus 710 may include one or more communication paths that permit communication among the components of device 700. Processor 720 may include a processor, microprocessor, or processing logic that may interpret and execute instructions. Memory 730 may include any type of dynamic storage device that may store information and instructions for execution by processor 720, and/or any type of non-volatile storage device that may store information for use by processor 720.

Input component 740 may include a mechanism that permits an operator to input information to device 700, such as a keyboard, a keypad, a button, a switch, etc. Output component 750 may include a mechanism that outputs information to the operator, such as a display, a speaker, one or more LEDs, etc.

Communication interface 760 may include any transceiver-like mechanism that enables device 700 to communicate with other devices and/or systems. For example, communication interface 760 may include an Ethernet interface, an optical interface, a coaxial interface, or the like. Communication interface 760 may include a wireless communication device, such as an infrared (IR) receiver, a Bluetooth® radio, or the like. The wireless communication device may be coupled to an external device, such as a remote control, a wireless keyboard, a mobile telephone, etc. In some embodiments, device 700 may include more than one communication interface 760. For instance, device 700 may include an optical interface and an Ethernet interface.

Device 700 may perform certain operations relating to one or more processes described above. Device 700 may perform these operations in response to processor 720 executing software instructions stored in a computer-readable medium, such as memory 730. A computer-readable medium may be defined as a non-transitory memory device. A memory device may include space within a single physical memory device or spread across multiple physical memory devices. The software instructions may be read into memory 730 from another computer-readable medium or from another device. The software instructions stored in memory 730 may cause processor 720 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

The invention claimed is:

1. A method comprising:
    receiving a three-dimensional (3D) object that is defined with a plurality of 3D primitives with each particular 3D primitive of the plurality of 3D primitives being defined with a plurality of parameters for a position of the particular 3D primitive and visual characteristics presented at the position, wherein the plurality of 3D primitives produce an original visual representation of the 3D object;
    defining at least one constraint on one or more parameters of the plurality of parameters, wherein the at least one constraint prioritizes reducing a first size of the 3D object by reducing an amount of data that is used to encode the one or more parameters relative to an amount of data that is used to encode other parameters of the plurality of parameters;
    generating different sets of 3D primitives with the amount of data that is used to encode the one or more parameters being reduced without reducing the amount of data that is used to encode the other parameters, with each set of the different sets of 3D primitives having a total size that is less than an optimized second size for the 3D object, and with each set of 3D primitives from the different sets of 3D primitives producing a different visual representation of the 3D object;
    selecting a particular set of 3D primitives from the different sets of 3D primitives that produces a visual representation that has less quality loss relative to the original visual representation than other sets of 3D primitives from the different sets of 3D primitives; and
    presenting the particular set of 3D primitives as a size-optimized representation of the 3D object with a size that is less than the first size and less than or equal to the optimized second size.

2. The method of claim 1 further comprising:
    evaluating each set of the different sets of 3D primitives using a loss function; and
    determining an amount by which positions and visual characteristics from the different visual representation created by each set of the different sets of 3D primitives differ from positions and visual characteristics of the original visual representation based on said evaluating.

3. The method of claim 1 further comprising:
    evaluating each set of the different sets of 3D primitives using a loss function; and
    determining whether each set of the different sets of 3D primitives differs from the plurality of 3D primitives by a threshold amount based on said evaluating.

4. The method of claim 1, wherein generating the different sets of 3D primitives comprises:
    providing the at least one constraint and the plurality of 3D primitives as inputs to a 3D generation model; and
    training the 3D generation model according to the at least one constraint original visual representation that is produced by the plurality of 3D primitives.

5. The method of claim 1, wherein the one or more parameters correspond to one or more positional coordinates for positioning a 3D primitive in a 3D space, 3D primitive color values, 3D primitive opacity, or 3D primitive reflectivity.

6. The method of claim 1, wherein the at least one constraint comprises:
    a data type constraint that reduces a number of bytes with which to encode each parameter of the one or more parameters.

7. The method of claim 1, wherein the at least one constraint comprises:
    a deduplication constraint that replaces repeating values in the one or more parameters of the different sets of 3D primitives with a single indexed value.

8. The method of claim 1, wherein the at least one constraint comprises:
    a size constraint that specifies the optimized second size as a target size for the size-optimized representation.

9. The method of claim 1 further comprising:
    analyzing variation in values across the plurality of parameters of the plurality of 3D primitives; and
    wherein defining the at least one constraint comprises selecting the one or more parameters for data reduction based on the one or more parameters having less variation in values than the other parameters.

10. The method of claim 1, wherein generating the different sets of 3D primitives comprises:
generating a first set of Gaussian splats that are defined with a first set of positions in a 3D space and a first set of colors; and
generating a second set of Gaussian splats that are defined with a second set of positions in the 3D space and a second set of colors, wherein the first set of Gaussian splats comprises a different number of Gaussian splats than the second set of Gaussian splats.

11. The method of claim 10, wherein selecting the particular set of 3D primitives comprises:
determining that the first set of Gaussian splats produce a visual representation that differs from the original visual representation by more than a threshold amount; and
selecting the second set of Gaussian splats as the particular set of 3D primitives in response to the second set of Gaussian splats producing a visual representation that differs from the original visual representation by less than the threshold amount.

12. The method of claim 1, wherein the original visual representation corresponds to one of a 3D mesh representation of the 3D object, a point cloud representation of the 3D object, or a set of two-dimensional images of the 3D object from different perspectives.

13. The method of claim 1 further comprising:
determining an amount of variation in values that are defined for each parameter of the plurality of parameters across the plurality of 3D primitives; and
selecting the one or more parameters for data reduction in response to the amount of variation in the values that are defined for the one or more parameters having less variation that the values that are defined for the other parameters.

14. A three-dimensional (3D) content creation system comprising:
one or more hardware processors configured to:
receive a 3D object that is defined with a plurality of 3D primitives with each particular 3D primitive of the plurality of 3D primitives being defined with a plurality of parameters for a position of the particular 3D primitive and visual characteristics presented at the position, wherein the plurality of 3D primitives produce an original visual representation of the 3D object;
define at least one constraint on one or more parameters of the plurality of parameters, wherein the at least one constraint prioritizes reducing a first size of the 3D object by reducing an amount of data that is used to encode the one or more parameters relative to an amount of data that is used to encode other parameters of the plurality of parameters;
generate different sets of 3D primitives with the amount of data that is used to encode the one or more parameters being reduced without reducing the amount of data that is used to encode the other parameters, with each set of the different sets of 3D primitives having a total size that is less than an optimized second size for the 3D object, and with each set of 3D primitives from the different sets of 3D primitives producing a different visual representation of the 3D object;
select a particular set of 3D primitives from the different sets of 3D primitives that produces a visual representation that has less quality loss relative to the original visual representation than other sets of 3D primitives from the different sets of 3D primitives; and
present the particular set of 3D primitives as a size-optimized representation of the 3D object with a second size that is less than the first size and less than or equal to the optimized second size.

15. The 3D content creation system of claim 14, wherein the one or more hardware processors are further configured to:
evaluate each set of the different sets of 3D primitives using a loss function; and
determine an amount by which positions and visual characteristics from the different visual representation created by each set of the different sets of 3D primitives differ from positions and visual characteristics of the original visual representation based on said evaluating.

16. The 3D content creation system of claim 14, wherein the one or more hardware processors are further configured to:
evaluate each set of the different sets of 3D primitives using a loss function; and
determine whether each set of the different sets of 3D primitives differs from the plurality of 3D primitives by a threshold amount based on said evaluating.

17. The 3D content creation system of claim 14, wherein generating the different sets of 3D primitives comprises:
providing the at least one constraint and the plurality of 3D primitives as inputs to a 3D generation model; and
training the 3D generation model according to the at least one constraint and the original visual representation that is produced by the plurality of 3D primitives.

18. The 3D content creation system of claim 14, wherein the one or more parameters correspond to one or more positional coordinates for positioning a 3D primitive in a 3D space, 3D primitive color values, 3D primitive opacity, or 3D primitive reflectivity.

19. The 3D content creation system of claim 14, wherein the at least one constraint comprises:
a data type constraint that reduces a number of bytes with which to encode each parameter of the one or more parameters.

20. A non-transitory computer-readable medium storing instructions that, when executed by one or more processors of a three-dimensional (3D) content creation system, cause the 3D content creation system to perform operations comprising:
receiving a 3D object that is defined with a plurality of 3D primitives with each particular 3D primitive of the plurality of 3D primitives being defined with a plurality of parameters for a position of the particular 3D primitive and visual characteristics presented at the position, wherein the plurality of 3D primitives produce an original visual representation of the 3D object;
defining at least one constraint on one or more parameters of the plurality of parameters, wherein the at least one constraint prioritizes reducing a first size of the 3D object by reducing an amount of data that is used to encode the one or more parameters relative to an amount of data that is used to encode other parameters of the plurality of parameters;
generating different sets of 3D primitives with the amount of data that is used to encode the one or more parameters being reduced without reducing the amount of data that is used to encode the other parameters, with each set of the different sets of 3D primitives having a total size that is less than an optimized second size for the 3D object, and with each set of 3D primitives from the different sets of 3D primitives producing a different visual representation of the 3D object;

selecting a particular set of 3D primitives from the different sets of 3D primitives that produces a visual representation that has less quality loss relative to the original visual representation than other sets of 3D primitives from the different sets of 3D primitives; and presenting the particular set of 3D primitives as a size-optimized representation of the 3D object with a size that is less than the first size and less than or equal to the optimized second size.

* * * * *